US 12,113,248 B2

(12) United States Patent
Zhang

(10) Patent No.: US 12,113,248 B2
(45) Date of Patent: Oct. 8, 2024

(54) CONNECTOR OF LARGE CYLINDRICAL BATTERY, BATTERY MODULE AND BATTERY PACK

(71) Applicant: EVE POWER CO., LTD., Jingmen (CN)

(72) Inventor: Guojiang Zhang, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 0 days.

(21) Appl. No.: 18/091,416

(22) Filed: Dec. 30, 2022

(65) Prior Publication Data

US 2023/0238673 A1 Jul. 27, 2023

Related U.S. Application Data

(63) Continuation of application No. PCT/CN2022/129989, filed on Nov. 4, 2022.

(30) Foreign Application Priority Data

Jan. 25, 2022 (CN) .......................... 202220226680.9

(51) Int. Cl.
H01M 50/581 (2021.01)
H01M 50/107 (2021.01)

(52) U.S. Cl.
CPC ....... H01M 50/581 (2021.01); H01M 50/107 (2021.01)

(58) Field of Classification Search
CPC .......................... H01M 50/581; H01M 50/107
See application file for complete search history.

(56) References Cited

U.S. PATENT DOCUMENTS

2009/0297892 A1    12/2009  Ijaz et al.
2020/0083512 A1 *   3/2020  Son .................... H01M 50/503
2022/0393310 A1 * 12/2022  Jeon ................... H01M 50/503

FOREIGN PATENT DOCUMENTS

CN    1901252 A  *  1/2007
CN  104134774 A  * 11/2014  .......... B23K 35/286
CN  107305938 A    10/2017
CN  109037569 A  * 12/2018
CN  109037572 A    12/2018

(Continued)

OTHER PUBLICATIONS

European Search Report, European Application No. 22829535.8, mailed Mar. 7, 2024 (6 pages).

(Continued)

Primary Examiner — Jimmy Vo

(57) ABSTRACT

The present application relates to the technical field of batteries and discloses a connector for a large cylindrical battery, a battery module, and a battery pack. The connector for the large cylindrical battery is configured for a large cylindrical battery having a positive electrode and a negative electrode on a same side, and includes a plurality of conductive units. Each conductive unit includes a positive-electrode connecting region, a negative-electrode connecting region, and a first current-limiting region provided between the positive-electrode connecting region and the negative-electrode connecting region. Adjacent conductive units are electrically connected to each other via a connection member.

14 Claims, 2 Drawing Sheets

(56) References Cited

FOREIGN PATENT DOCUMENTS

| | | |
|---|---|---|
| CN | 110911625 A | 3/2020 |
| CN | 213340646 U | 6/2021 |
| CN | 217158544 U | 8/2022 |
| EP | 3561908 A1 | 10/2019 |
| JP | 2002056839 A | 2/2002 |
| JP | 2013525942 A | 6/2013 |
| KR | 20200029871 A | 3/2020 |
| WO | 2019058938 A1 | 3/2019 |
| WO | 2019181285 A1 | 9/2019 |
| WO | 2021201446 A1 | 10/2021 |
| WO | 2021206426 A1 | 10/2021 |

OTHER PUBLICATIONS

International Search Report issued in corresponding International application No. PCT/CN2022/129989, mailed Jan. 6, 2023.
Written Opinion of the International Search Authority in corresponding International application No. PCT/CN2022/129989, mailed Jan. 6, 2023.
JPO, Office Action for JP Application No. 2023-524877, mailed Jul. 2, 2024 (10 pages).

* cited by examiner

CONNECTOR OF LARGE CYLINDRICAL BATTERY, BATTERY MODULE AND BATTERY PACK

CROSS REFERENCE TO RELATED APPLICATIONS

The present application is a continuation-application of the International Patent Application No. PCT/CN2022/129989, filed on Nov. 4, 2022, which claims the priority of the Chinese Patent Application No. 202220226680.9, filed on Jan. 25, 2022, in the China National Intellectual Property Administration, and the entire contents of which are hereby incorporated by reference in their entireties.

TECHNICAL FIELD

The present disclosure relates to the field of batteries, and for example relates to a connector of a large cylindrical battery, a battery module, and a battery pack.

BACKGROUND

In order to increase an output voltage or an output current, more than one batteries may be connected in series or parallel with each other to form a battery module. A power of the battery module is converged to two terminal fittings. Further, the electrical energy may be output to a load through a corresponding circuit. A battery module in the art may have a high current during operation. Therefore, while the battery module is outputting the electrical energy, the current may be overloaded, causing the circuit to have an excessively high temperature, burning the staff or the battery module, such that a service life of the battery may be reduced, and safety and efficiency of the battery may be reduced.

To solve the above technical problem, in the art, a current-limiting connector may be arranged in the battery module. When the current of the battery module is overloaded to cause the temperature of the circuit to increase, the current-limiting connector may be fused to disconnect the circuit, such that the circuit is protected. However, the structure only works when the overloaded current passes through the current-limiting tab. Therefore, only some batteries of the battery module may be protected from being damaged due to the current being overloaded. The structure is less sensitive, and a large loss may be caused due to the current being overloaded.

SUMMARY OF THE DISCLOSURE

The present disclosure provides a connector for a large cylindrical battery, allowing large cylindrical batteries to be connected in series and parallel with each other. Further, a short-circuit protection is configured to cut a current in time, reducing a loss caused by a short circuit and improving a service life and safety of the batteries.

In a first aspect, the present disclosure provides:

A connector of a large cylindrical battery is configured for a large cylindrical battery having a positive electrode and a negative electrode on a same side, and includes a plurality of conductive units.

Each of the plurality of conductive units includes a positive-electrode connecting region, a negative-electrode connecting region, and a first current-limiting region arranged between the positive-electrode connecting region and the negative-electrode connecting region.

When a temperature of a circuit reaches a melting point of the first current-limiting region, the first current-limiting region is fused. Adjacent conductive units of the plurality of conductive units are electrically connected to each other by a connecting member.

In a second aspect, a battery module is provided and includes a plurality of large cylindrical batteries and the connector of the large cylindrical battery as described in the above. A positive electrode and a negative electrode of each of the plurality of large cylindrical batteries are located on a same side.

In a third aspect, a battery pack is provided and includes the battery module as described in the above.

100, conductive unit; 110, positive-electrode connecting region; 120, negative-electrode connecting region; 121, circular notch; 130, first current-limiting region; 131, first through hole; 200, connecting member; 210, second current-limiting region; 211, second through hole.

DETAILED DESCRIPTION

In the description of the present disclosure, unless otherwise expressly specified and limited, terms "connected", "coupled", and "fixed" shall be interpreted broadly, such as fixed connection, detachable connection, being configured as an integral one-piece structure; mechanical connection, electrical connection; direct connection, indirect connection through an intermediate medium, internal communication between two elements, or an interaction between two elements. For any ordinary skilled person in the art, a specific meaning of the above terms in the context of the present disclosure shall be understood case by case.

In the present disclosure, unless otherwise expressly specified and limited, a first feature "on" or "under" a second feature may include the first feature directly contacting the second feature, or the first feature indirectly contacting the second feature through an additional feature there between. In addition, the first feature "above", "over" and "on top of" the second feature includes the first feature being directly and diagonally above the second feature, or simply indicates that the first feature is horizontally higher than the second feature. The first feature "below", "under" and "beneath" the second feature includes the first feature being directly and diagonally below the second feature, or simply indicates that the first feature is horizontally lower than the second feature.

In the description of the present disclosure, terms "up", "down", "left", "right", and other orientations or positional relationships are expressed based on the accompanying drawings. The terms are used for the purpose of description and for simplifying operations, but shall not be interpreted as indicating or implying that a device or an element referred to must have a particular orientation, be configured and be operating in a particular orientation. Therefore, the above terms shall not be interpreted as limiting the present disclosure. Furthermore, terms "first" and "second" are used only for distinguishing features while describing the features, and do not have special meanings.

The present disclosure provides a connector for a large cylindrical battery, allowing large cylindrical batteries to be connected in series and in parallel with each other. Further, a short-circuit protection is configured to cut a current in time, reducing a loss caused by a short circuit and improving a service life and safety of the batteries.

Figure 1:
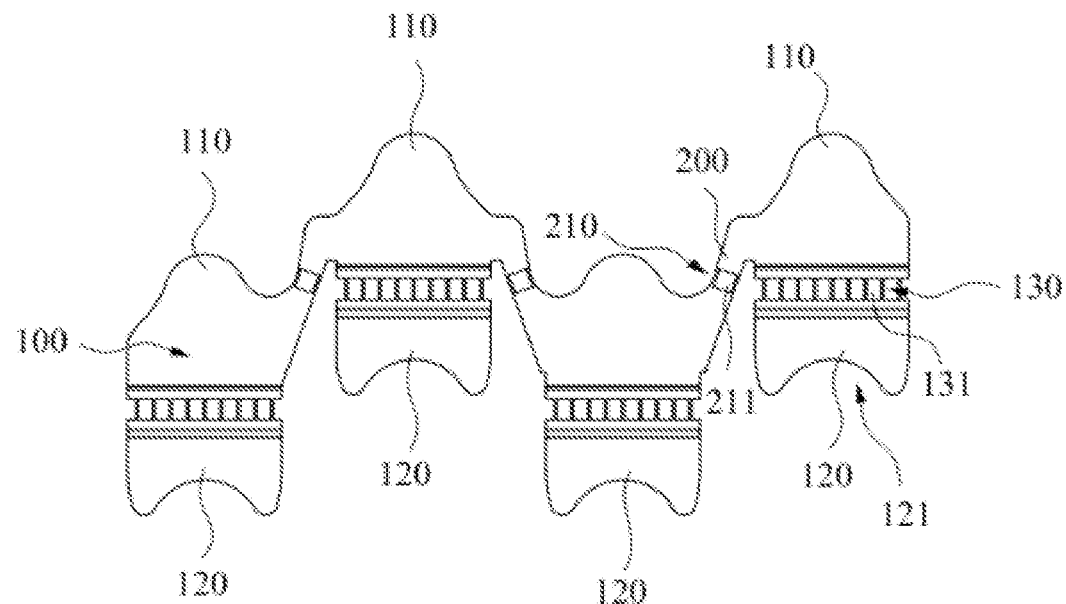
FIG. 1 is a structural schematic view I of a connector for a large cylindrical battery according to an embodiment of the present disclosure.

In an embodiment, as shown in FIG. 1, the connector is configured for a large cylindrical battery whose positive electrode and negative electrode are located on a same side and includes a plurality of conductive units 100. Each of the plurality of conductive units 100 includes a positive-electrode connecting region 110 and a negative-electrode connecting region 120. The positive-electrode connecting region 110 is configured to connect positive electrodes of two adjacent large cylindrical batteries, and the negative-electrode connecting region 120 is configured to connect negative electrodes of two adjacent large cylindrical batteries, allowing the two adjacent large cylindrical batteries to be connected in series or in parallel with each other. A first current-limiting region 130 is arranged between the positive-electrode connecting region 110 and the negative-electrode connecting region 120. When a temperature of a circuit is excessively high due to an extreme situation such as a short circuit, the first current-limiting region 130 itself may be heated and fused to cut a current between the two adjacent large cylindrical batteries, a current loop may be cut, such that the first current-limiting region 130 may protect the circuit. Adjacent conductive units 100 are electrically connected to each other by a connecting member 200.

The first current-limiting region 130 is arranged between the positive-electrode connecting region 110 and the negative-electrode connecting region 120. In this way, when the temperature in the circuit is excessively high, the first current-limiting region 130 may be fused to protect large cylindrical batteries that are connected in series by an individual conductive unit 100. Compared to related art where a plurality of batteries are configured with one fuse, by configuring the above-mentioned connector for the large cylindrical battery of the present disclosure, a damaged large cylindrical battery may be identified quickly after the first current-limiting region 130 is fused, such that labor may be saved, operating-hours may be reduced, and subsequent maintenance and replacement may be performed easily. By configuring the connection member 200 to connect the adjacent conductive units 100, the large cylindrical batteries may be connected in parallel with each other.

Exemplarily, a second current-limiting region 210 can be arranged on the connecting member 200. When the temperature of the circuit is excessively high due to an extreme situation such as the short circuit, the second current-limiting region 120 itself may be heated and fused to quickly cut a current between adjacent sets of large cylindrical batteries, the current loop may be cut, such that the second current-limiting region 210 may protect the circuit, and the safety of the large cylindrical batteries may be improved. For example, the connector may include a first conductive unit and a second conductive unit electrically connected to the first conductive unit. Two large cylindrical batteries may be connected in series with each other through the first conductive unit and serve as a first set of large cylindrical batteries, and another two large cylindrical batteries may be connected in series with each other through the second conductive unit and serve as a second set of large cylindrical batteries adjacent to the first set of large cylindrical batteries. The current is flowing between the first set of large cylindrical batteries and the second set of large cylindrical batteries, and the current loop is formed between the first set of large cylindrical batteries and the second set of large cylindrical batteries.

Exemplarily, as shown in FIG. 1, in an embodiment, a first through hole 131 may be defined in the first current-limiting region 130, allowing a cross-sectional area of the first current-limiting region 130 to be less than each of a cross-sectional area of the positive-electrode connecting region 110 and a cross-sectional area of the negative-electrode connecting region 120. When the temperature of the circuit is excessively high due to an extreme situation such as the short circuit, the first current-limiting region 130 may be melt and fused, due to concentrated thermal stresses, to cut the current loop, such that the circuit may be protected. Similarly, a second through hole 211 may be defined in the second current-limiting region 210, allowing a cross-sectional area of the second current-limiting region 210 to be less than a cross-sectional area of the connecting member 200. When the temperature of the circuit is excessively high due to an extreme situation such as the short circuit, the second current-limiting region 210 may be melt and fused, due to concentrated thermal stresses, to cut the current loop, such that the circuit may be protected.

Exemplarily, as shown in FIG. 1, a plurality of first through holes 131 may be arranged along a width direction of the conductive unit 100 and may be spaced apart from each other. A current-limiting segment may be disposed between adjacent two of the plurality of first through holes 131. In the present embodiment, as shown in FIG. 1, arrangement of the plurality of first through holes 131 may start from an edge of the first current-limiting region 130 along the width direction, i.e., the starting one of the plurality of first through holes 131 serves as a notch at the edge of the first current-limiting region 130. The arrangement of the plurality of first through holes 131 may be terminated, based on the width of the first current-limiting region 130, at another notch or a current-limiting segment disposed at the other edge of the first current-limiting region 130 along the width direction. That is, the last one of the plurality of first through holes 131 serves as another notch at the other edge of the first current-limiting region 130 along the width direction; or the current-limiting segment disposed at the other edge of the first current-limiting region 130 along the width direction, and the end one of the plurality of first through holes 131 is located adjacent to the current-limiting segment. In another embodiment, the arrangement of the plurality of first through holes 131 may start from a current-limiting segment disposed at the edge of the first current-limiting region 130 along the width direction. Alternatively, in the present embodiment, the plurality of first through holes 131 are spaced apart from each other, and distances between every two adjacent first through holes are the same. All current limiting segments have a same cross-sectional area to avoid a situation that the current loop is cut due to different cross-sectional areas of the current limiting segments, where a current limiting segment having a smaller cross-sectional area may be fuse earlier than a fusing current being reached. In this way, the circuit may operate normally. A size of a current limiting segment between adjacent first through holes 131 may be determined based on actual needs.

Alternatively, a metal having a low melting point, such as tin, may be arranged on the first current-limiting region 130. Exemplarily, the metal having the low melting point may be arranged on the current limiting segment. When the circuit is in an extreme situation such as having the short circuit, the current in the circuit increases rapidly. The increase of the current may cause the temperature of the circuit to increase. When the temperature reaches a value to allow the metal having the low melting point to melt, an alloying process begins, a resistance of a region where the alloy is located may be increased, enabling a temperature at the current limiting segment to be increased rapidly, such that the metal having the low melting point may melt within milliseconds, the current may be cut, and the circuit may be protected. The metal having the low melting point may be fixed in the first current-limiting region 130 by welding, or arranged in the first current-limiting region 130 by other means. The means of arranging the first current-limiting region 130 may be determined based on actual needs. By defining the first through holes 131 and the metal having the low melting point in the first current-limiting region 130, the circuit may be protected in two manners, and safety of the large cylindrical battery may be improved.

Alternatively, the metal having the low melting point, such as tin, may be arranged on the second current-limiting region 210. When the circuit is in an extreme situation such as having the short circuit, the current in the circuit increases rapidly. The increase of the current may cause the temperature of the circuit to increase. When the temperature reaches a value to allow the metal having the low melting point to melt, the alloying process begins, the resistance of the region where the alloy is located may be increased, enabling a temperature at the second current-limiting region 210 to be increased rapidly, such that the metal having the low melting point may melt within milliseconds, the current may be cut, and the circuit may be protected. The metal having the low melting point may be fixed in the second current-limiting region 210 by welding, or arranged in the second current-limiting region 210 by other means. The means of arranging the first current-limiting region 130 may be determined based on actual needs. By defining the second through holes 211 and the metal having the low melting point in the second current-limiting region 210, the circuit may be protected in two manners, and safety of the large cylindrical battery may be improved.

Exemplarily, in another embodiment, the first current-limiting region 130 may be thin, such that a thickness of the first current-limiting region 130 is less than a thickness of the rest of the conductive unit 100. That is, the cross-sectional area of the first current-limiting region 130 is less than a cross-sectional area of the rest of the conductive unit 100. When the circuit is in an extreme situation such as having the short circuit, the first current-limiting region 130 may be fused due to concentrated thermal stresses since having a relatively small cross-sectional area, such that the current loop is cut, and a core and the circuit may be protected. Of course, the second current-limiting region 210 may be thin, such that a thickness of the second current-limiting region 210 is less than a thickness of the connecting member 200. That is, a cross-sectional area of the second current-limiting region 210 is less than a cross-sectional area of the connecting member 200. When the circuit is in an extreme situation such as having the short circuit, the second current-limiting region 210 may be fused due to concentrated thermal stresses since having a relatively small cross-sectional area, such that the current loop is cut, and a core and the circuit may be protected. The thickness of the first current-limiting region 130 and the thickness of the second current-limiting region 210 may be determined based on the fusing requirements.

In some embodiments, the thickness of the first current-limiting region may be 0.8 mm to 1.6 mm, exemplarily may be 0.8 mm, 1.0 mm, 1.2 mm, 1.4 mm, 1.6 mm, and so on. The thickness of the first current-limiting region may be determined based on a current limit value of the current and a need for a circuit fusing current. It is conceivable that the thickness of the second current-limiting region 210 may also be 0.8 mm to 1.6 mm, exemplarily may be 0.8 mm, 1.0 mm, 1.2 mm, 1.4 mm, 1.6 mm, and so on. The thickness of the first current-limiting region may be determined based on fusing requirements.

Figure 2:
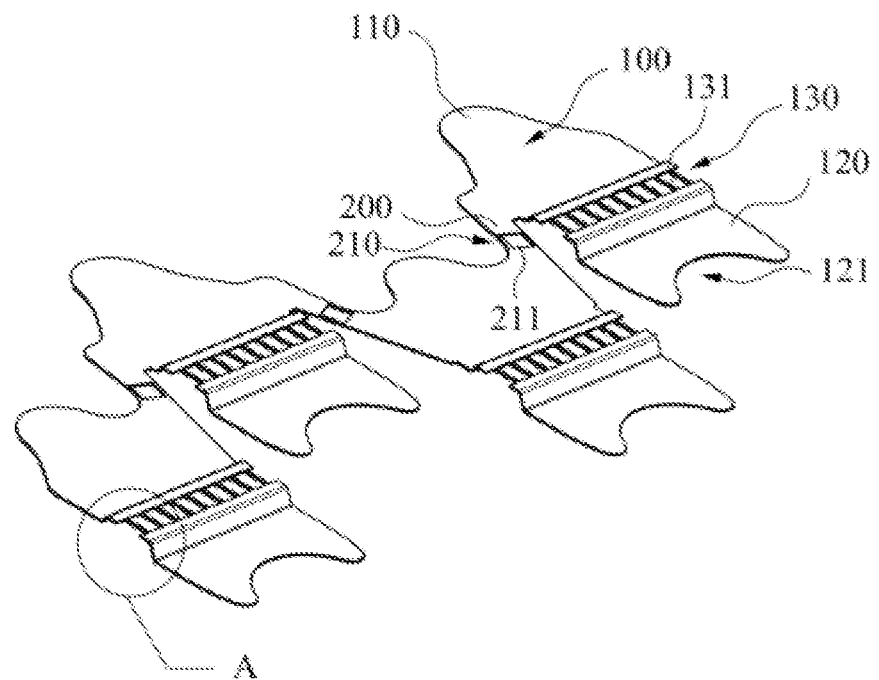
FIG. 2 is a structural schematic view II of a connector for a large cylindrical battery according to an embodiment of the present disclosure.
Figure 3:
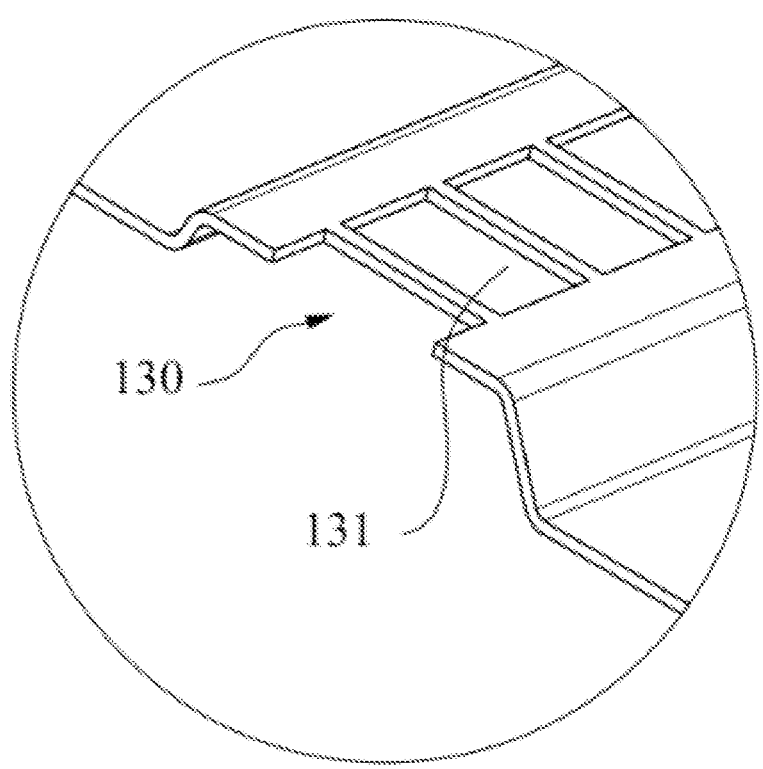
FIG. 3 is an enlarged view of a portion A shown in FIG. 2.

Alternatively, as shown in FIG. 2 and FIG. 3, in an embodiment, the conductive unit 100 may be configured as a protruded structure, and the first current-limiting region 130 may be disposed on a protruded portion of the protruded structure. On one hand, by disposing the first current-limiting region 130 on the protruded portion, a fusing space of the first current-limiting region 130 can be increased, such that the first current-limiting region can be fused more quickly, and the large cylindrical battery may be prevented from being damaged by a high temperature generated when the first current-limiting region 130 is fused. On the other hand, there is a certain height difference between the positive electrode and the negative electrode of the large cylindrical battery, and while the battery module is being used, the plurality of large cylindrical batteries may slightly shake in relative to each other. The conductive unit 100 is generally connected to the positive electrode and the negative electrode of the large cylindrical battery by welding. As the large cylindrical batteries shake, the above-mentioned connector for the large cylindrical battery may be stretched or compressed. Therefore, the conductive unit 100 is configured as the protruded structure to provide a certain buffer space for the connector of the large cylindrical battery, preventing the connector of the large cylindrical battery from being broken, and improving operating reliability of the connector of the large cylindrical battery. Alternatively, the protruded structure is a 几-shaped structure. In particular, the protruded structure includes three portions: a first sub-structure, a second sub-structure, and a third sub-structure. The first sub-structure is connected to an end of the second sub-structure, and the third sub-structure is connected to the other end of the second sub-structure. The first sub-structure and the third sub-structure are disposed perpendicularly on a same side of the second sub-structure. In another embodiment, the conductive unit 100 may be configured as a Z-shaped structure, and the first current-limiting region 130 may be arranged on an inclined part of the Z-shaped structure. In other embodiments, the conductive unit 100 may be arranged with a wavy structure, and the first current-limiting region 130 may be arranged on the wavy structure. The configuration of the conductive unit 100 may be determined based on actual needs.

Alternatively, in an embodiment, the conductive unit 100 may be made of copper. The copper is highly electrically conductive, highly thermally conductive, and resistant to corrosion. In other embodiments, other conductive metals may be configured, and may be determined based on actual needs.

Exemplarily, the positive electrode and the negative electrode of the large cylindrical battery are located on a same side, the positive electrode is a cylindrical protrusion located at a middle of the battery, and the negative electrode is around the protrusion. Therefore, an arc-shaped notch, which matches a positive electrode post of the large cylindrical battery, may be arranged in the negative-electrode connecting region 120. This structure may increase a connection area between the negative-electrode connecting region 120 and the negative electrode of the large cylindrical battery, such that reliability of the connection between the negative-electrode connecting region 120 and the negative electrode of the large cylindrical battery, improving the operating reliability of the connector of the large cylindrical battery.

Exemplarily, the positive-electrode connecting region 110 may include an arc-shaped section, and an outer edge of the arc-shaped section partially coincides with an outer edge of the positive electrode post of the large cylindrical battery, i.e., a shape of the outer edge of the arc-shaped section matches and fits with a shape of the outer edge of the positive electrode post. On one hand, the positive-electrode connecting region 110 may be positioned in advance based on the positive electrode post of the large cylindrical battery, reducing difficulty of manual welding. On the other hand, while a connection area between the positive electrode post of the large cylindrical battery and the positive-electrode connecting region 110 is maximized, a size of the positive-electrode connecting region 110 may be reduced, materials may be saved, and costs may be reduced.

The first current-limiting region 130 and the second current-limiting region 210 are arranged, the first through holes 131 are defined in the first current-limiting region 130, and the second through holes 211 are defined in the second current-limiting region 210. In this way, the cross-sectional area of the first current-limiting region 130 is less than the cross-sectional area of the conductive unit 100 along the width direction. The cross-sectional area of the second current-limiting region 210 is less than the cross-sectional area of the connecting member 200. When the circuit is in the extreme condition such as having the short circuit, the first current-limiting region 130 and the second current-limiting region 210 may be fused due to concentrated thermal stresses, such that large cylindrical batteries may be quickly disconnected from each other, the circuit loop of the entire battery module may be cut in time. In this way, the large cylindrical battery may be protected, a thermal runaway loss may be reduced, and costs may be saved. In addition, a large cylindrical battery that cannot operate normally may be identified quickly, facilitating subsequent maintenance and replacement.

The present disclosure further provides a battery module including large cylindrical batteries and a connector of large cylindrical batteries as described in the above, wherein the positive electrode and the negative electrode of each of the large cylindrical batteries are located on the same side.

Exemplarily, in an embodiment, a plurality of large cylindrical batteries are arranged into a plurality of sets, and large cylindrical batteries of adjacent sets are misaligned with each other along an extending direction of the first current-limiting region 130. Correspondingly, adjacent conductive units 100 are misaligned with each other along an extending direction of the first current-limiting region 130, such that an assembling space may be reduced, a size of the above-described battery module may be reduced, and costs may be reduced.

The present disclosure further provides a battery pack including the battery module as described in the above.

What is claimed is:

1. A connector of a large cylindrical battery, configured for a large cylindrical battery having a positive electrode and a negative electrode on a same side, and the connector comprising a plurality of conductive units;
   wherein each of the plurality of conductive units comprises a positive-electrode connecting region, a negative-electrode connecting region, and a first current-limiting region arranged between the positive-electrode connecting region and the negative-electrode connecting region;
   when a temperature of a circuit reaches a melting point of the first current-limiting region, the first current-limiting region is fused; and
   every two adjacent conductive units of the plurality of conductive units are electrically connected to each other by a connecting member;
   wherein the connecting member is connected between the positive-electrode connecting region of one of the two adjacent conductive units and the positive-electrode connecting region of the other one of the two adjacent conductive units; a second current-limiting region is arranged on the connecting member; when the temperature of the circuit reaches a melting point of the second current-limiting region, the second current-limiting region is fused; and
   each of the first current-limiting region and the second connecting member defines at least one through hole.

2. The connector of a large cylindrical battery according to claim 1, wherein the at least one through hole comprises one or more first through holes defined in the first current-limiting region and a second through hole defined in the second current-limiting region.

3. The connector of a large cylindrical battery according to claim 2, wherein the number of the one or more first through holes is more than one; the more than one first through holes are arranged along a width direction of each of the plurality of conductive units and are spaced apart from each other.

4. The connector of a large cylindrical battery according to claim 2, wherein a metal having a low melting point is arranged on at least one of the first current-limiting region and the second current-limiting region.

5. The connector of a large cylindrical battery according to claim 1, wherein the connector is configured to meet at least one of the following:
   for each of the plurality of conductive units, a thickness of the first current-limiting region is less than a thickness of the rest portion of the conductive unit; and
   a thickness of the second current-limiting region is less than a thickness of the rest portion of the connecting member.

6. The connector of a large cylindrical battery according to claim 5, wherein the thickness of the first current-limiting region is 0.8 mm to 1.6 mm.

7. The connector of a large cylindrical battery according to claim 1, wherein each of the plurality of conductive units is configured as a protruded structure, and a protruded portion of the protruded structure serves as the first current-limiting region.

8. The connector of a large cylindrical battery according to claim 1, wherein each of the plurality of conductive units is configured as a Z-shaped structure, and an inclined part of the Z-shaped structure serves as the first current-limiting region.

9. The connector of a large cylindrical battery according to claim 1, wherein each of the plurality of conductive units is arranged with a wavy structure, and the first current-limiting region is arranged on the wavy structure.

10. The connector of a large cylindrical battery according to claim 1, wherein the negative-electrode connecting region comprises an arc-shaped notch that matches a positive electrode post of the large cylindrical battery.

11. The connector of a large cylindrical battery according to claim 1, wherein the positive-electrode connecting region comprises an arc-shaped section, and a shape of an outer edge of the arc-shaped section matches and fits with a shape of an outer edge of the positive electrode post.

12. A battery module, comprising a plurality of large cylindrical batteries and a connector of a large cylindrical battery, wherein a positive electrode and a negative electrode of each of the plurality of large cylindrical batteries are located on a same side; and the connector comprises a plurality of conductive units;

wherein each of the plurality of conductive units comprises a positive-electrode connecting region, a negative-electrode connecting region, and a first current-limiting region arranged between the positive-electrode connecting region and the negative-electrode connecting region;

when a temperature of a circuit reaches a melting point of the first current-limiting region, the first current-limiting region is fused; and every two adjacent conductive units of the plurality of conductive units are electrically connected to each other by a connecting member;

wherein the connecting member is connected between the positive-electrode connecting region of one of the two adjacent conductive units and the positive-electrode connecting region of the other one of the two adjacent conductive units; a second current-limiting region is arranged on the connecting member; when the temperature of the circuit reaches a melting point of the second current-limiting region, the second current-limiting region is fused; and each of the first current-limiting region and the second connecting member defines at least one through hole.

13. The battery module according to claim 12, wherein the plurality of large cylindrical batteries are arranged into a plurality of sets, large cylindrical batteries of adjacent sets of the plurality of sets are misaligned with each other, and adjacent conductive units of the plurality of conductive units are misaligned with each other.

14. A battery pack, comprising a battery module, wherein the battery module comprises a plurality of large cylindrical batteries and a connector of a large cylindrical battery, a positive electrode and a negative electrode of each of the plurality of large cylindrical batteries are located on a same side; and the connector comprises a plurality of conductive units;

wherein each of the plurality of conductive units comprises a positive-electrode connecting region, a negative-electrode connecting region, and a first current-limiting region arranged between the positive-electrode connecting region and the negative-electrode connecting region;

when a temperature of a circuit reaches a melting point of the first current-limiting region, the first current-limiting region is fused; and every two adjacent conductive units of the plurality of conductive units are electrically connected to each other by a connecting member;

wherein the connecting member is connected between the positive-electrode connecting region of one of the two adjacent conductive units and the positive-electrode connecting region of the other one of the two adjacent conductive units; a second current-limiting region is arranged on the connecting member; when the temperature of the circuit reaches a melting point of the second current-limiting region, the second current-limiting region is fused; and each of the first current-limiting region and the second connecting member defines at least one through hole.

\* \* \* \* \*